UNITED STATES PATENT OFFICE.

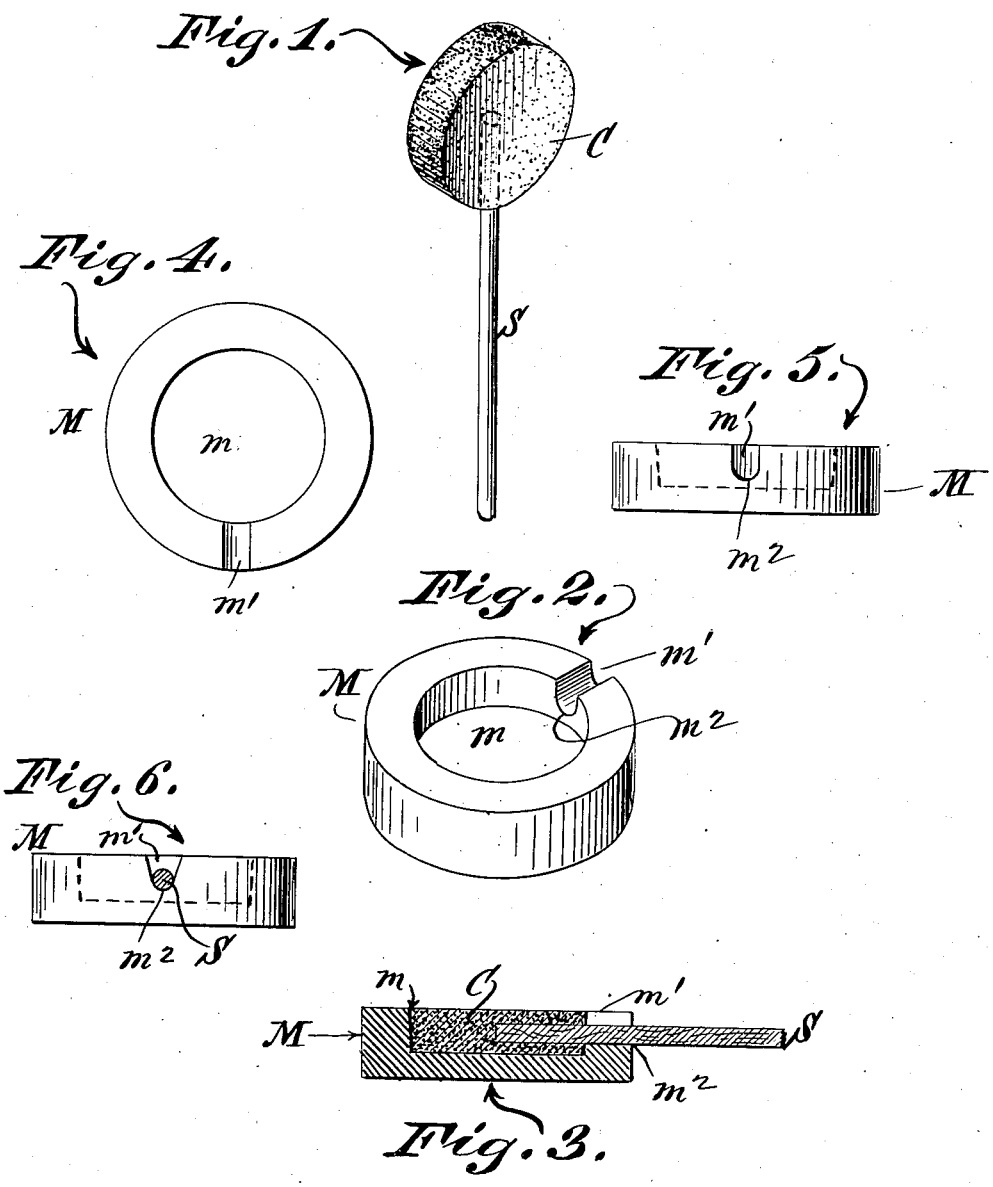

HENRY M. HINCK, OF BROOKLYN, NEW YORK, ASSIGNOR TO CLARENCE B. HART, OF BROOKLYN, NEW YORK.

MOLD FOR THE FORMATION OF CANDIED STICKS.

1,312,325.   Specification of Letters Patent.   Patented Aug. 5, 1919.

Application filed February 26, 1919.   Serial No. 279,275.

*To all whom it may concern:*

Be it known that I, HENRY M. HINCK, a citizen of the United States, residing in the borough of Brooklyn, county of Kings, city and State of New York, have invented certain new and useful Improvements in Molds for the Formation of Candied Sticks, of which the following is a specification.

My invention relates particularly to means for facilitating the making of the candied sticks so much in vogue at the present time and known at lollipops, suckers, etc., consisting of a flat lump of relatively hard candy applied to the end of a stick for convenience in handling,—the candy presumably being sucked or licked off the stick, at the convenience of the user. Heretofore the candy while in a warm, plastic state has been roughly shaped and pressed around an end of the stick by hand, or an end of the stick has been forcibly pushed into the mass, the cooling and hardening of which affixed it to the stick more or less securely. This is obviously an inconvenient and unsanitary method of making the candied sticks of the character designated, besides which there is little uniformity in the shape of the lumps of confectionery so provided with handles.

It is the object of my invention to obviate these objectionable features, and at the same time to attain a product of uniform size and shape in a sanitary manner, and in less time and with less manipulation than heretofore in the manufacture of such confections by hand,—my invention being designed more especially for the benefit of small dealers and confectioners who manufacture their own goods on the premises where sold,—the confections being made fresh every day or as required for immediate retail trade. Hence, I have produced, and my invention consists in, a candy mold formed with a bearing socket in its side wall for the reception, support and centralization of a stick to be candied, as hereinafter described and claimed specifically.

In the accompanying drawings,

Figure 1, is an isometrical perspective of a candied stick of the character designated herein;

Fig. 2, is an isometrical view of my mold for use in the hand manufacture thereof;

Fig. 3, is a central vertical section of the mold with the candy and stick embedded therein;

Fig. 4, is a top view of the mold;

Fig. 5, is an edge view thereof; and

Fig. 6, is a like view, showing a cross section of a stick positioned in the centralizing and supporting socket.

The matrix $m$, of the mold M, is preferably, though not necessarily, circular in configuration, and of a depth required to afford the desired thickness of disk or slab of candy C. The side wall of the mold M, is formed with a radial recess or bearing socket $m'$, having a convergent bottom $m^2$, for the reception and support of a stick S, to be candied.

The bottom and side walls of the bearing socket $m'$, not only afford a rest and support for the stick S, but they also centralize it and aline it accurately with relation to both the center and the depth of the matrix $m$, as will be seen by reference more particularly to Fig. 6, of the drawings,—it being understood that the depth of the socket $m'$, is such, taking into consideration the thickness of the stick to be used, that the stick S, will be positioned in the matrix $m$, medially as related to the depth thereof as shown in Fig. 3, and hence, that the stick will be centralized in every respect in the candy cast when formed.

The candy cast C, is effected in the mold and around the stick while the candy is in a plastic condition, and this may be accomplished by suitable implements, and the mass of candy compressed in the mold M, and around the end of the stick S, without subjecting the candy to direct contact with the fingers or hands of the manipulator,—thus rendering my method of the formation of the candy disk or slab C, upon the end of the stick S, much more sanitary than the old method of finger molding heretofore resorted to. Furthermore the method is not only more accurate as to uniformity of shape, but it saves both time and labor, and hence lessens the cost of production.

What I claim as my invention and desire to secure by Letters Patent is,

1. A mold for making candied sticks, said mold being formed with a lateral bearing socket having convergent walls for the reception, support and centralization of a stick the end of which is to be embedded in a candy cast, as and for the purpose described.

2. A mold for the formation of candied sticks having its side wall formed with a radial channel communicating with the interior of the mold, the bottom of the said channel being disposed above the bottom of the interior of the mold.

HENRY M. HINCK.

Witnesses:
GEO. WM. MIATT,
DOROTHY MIATT.